April 22, 1952　　M. H. TONCRAY ET AL　　2,593,632
MOTOR VEHICLE
Filed Aug. 21, 1948　　2 SHEETS—SHEET 1
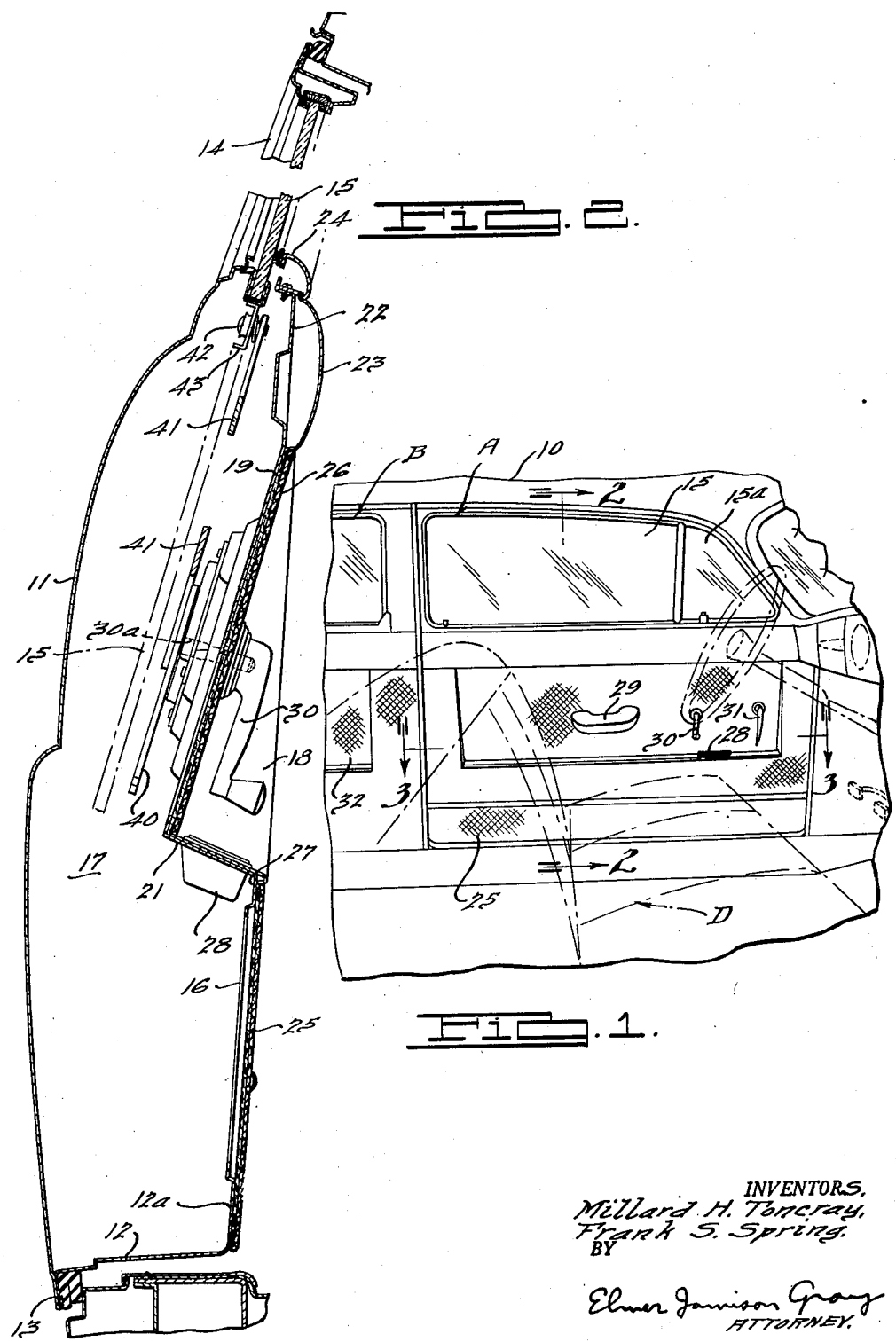
INVENTORS.
Millard H. Toncray,
Frank S. Spring.
BY
Elmer Jamison Gray
ATTORNEY.

April 22, 1952 — M. H. TONCRAY ET AL — 2,593,632

MOTOR VEHICLE

Filed Aug. 21, 1948 — 2 SHEETS—SHEET 2

INVENTORS.
Millard H. Toncray,
Frank S. Spring.
BY Elmer Jamison Gray
ATTORNEY.

Patented Apr. 22, 1952

2,593,632

UNITED STATES PATENT OFFICE 2,593,632

MOTOR VEHICLE

Millard H. Toncray and Frank S. Spring, Grosse Pointe, Mich., assignors to Hudson Motor Car Company, Detroit, Mich., a corporation of Michigan Application August 21, 1948, Serial No. 45,444

8 Claims. (Cl. 296—44)

This invention relates to vehicle bodies, such as automobile bodies, and in particular to improvements in the inner door and body panel or wall structure of an automobile body or the like.

An object of the invention is to provide a vehicle body in which the inner walls of the doors thereof are recessed in such manner as to provide not only arm room for passengers seated next to the doors but also spaces within which body hardware, such as door and window regulator handles, may be mounted so as to minimize interference with the arms of the passengers and thereby eliminate objectionable and dangerous obstructions common to conventional automobile bodies.

A further object of the invention is to provide a door structure for an automobile body or the like in which the inner side of the door is provided with a recess of less area formed by means of a wall portion inclined outwardly and downwardly and terminating at its lower edge in a shelf forming the base of the recess, the shelf sloping inwardly from the back wall of the recess and terminating along a line substantially in the normal plane of the inner surface of the door. As a result of this improved construction the recess, by affording additional arm room, increases the effective space between opposite doors of the body thereby contributing to the comfort of the passengers, this advantage being enhanced by the downward inclination of the shelf which permits convenient mounting of an ash tray thereon while at the same time disposing the inner edge of the shelf below the elbows of the passengers.

Another object of the invention is to provide an improved automobile body or the like having the upright wall structure at each end of the rear seat formed with a recess similar to the door recesses above referred to and likewise adapted to contribute to the comfort and safety of the rear seat passengers by providing increased arm room and eliminating dangerous obstructions protruding inwardly from the normal plane of the walls at opposite ends of the seat.

Other objects of this invention will appear in the following description and appended claims, reference being had to the accompanying drawings forming a part of this specification wherein like reference characters designate corresponding parts in the several views.

Fig. 1 is a fragmentary side elevation of the inside front portion of an automobile body constructed in accordance with the present invention.

Fig. 2 is an enlarged fragmentary vertical section taken substantially through lines 2—2 of Fig. 1 looking in the direction of the arrows.

Figure 3:
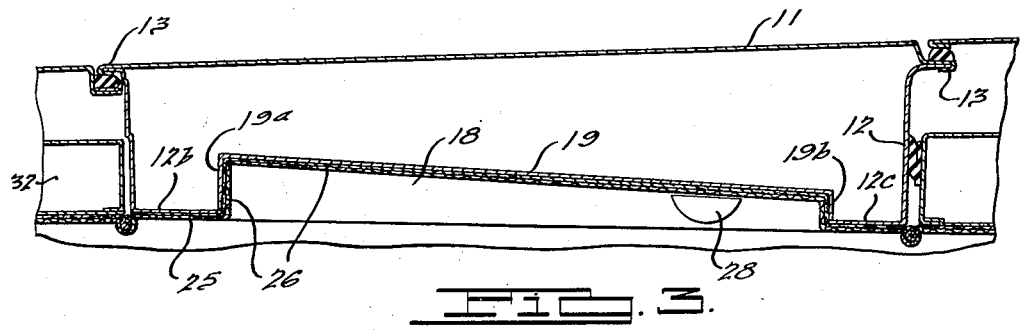
Fig. 3 is an enlarged horizontal section taken substantially through lines 3—3 of Fig. 1 looking in the direction of the arrows.
Figure 4:
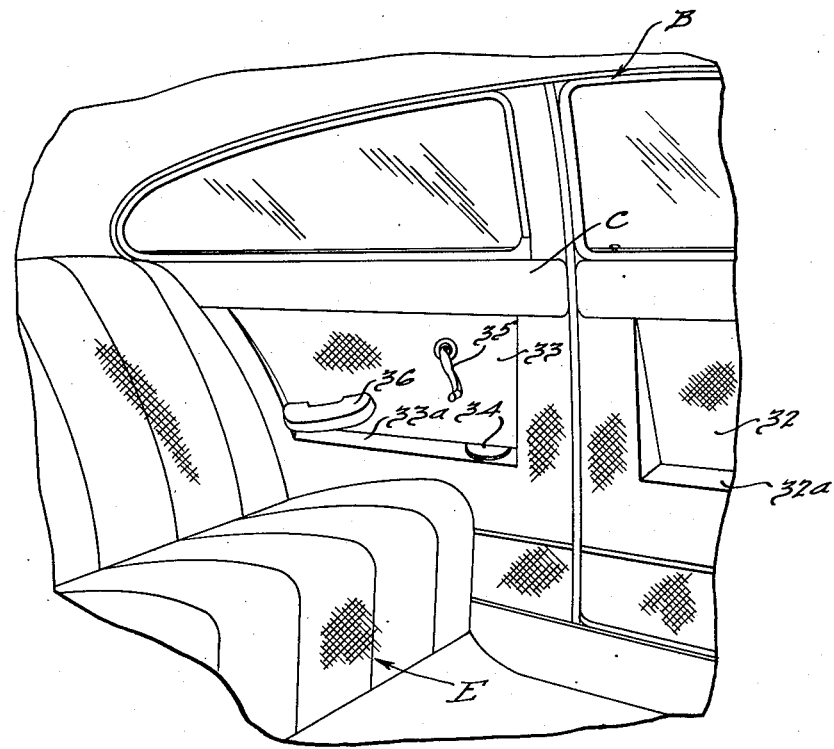
Fig. 4 is a fragmentary side elevation of the inside rear portion of the automobile body.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Although the present invention is shown by way of example as applied to an automobile body 10 of the four door type having front and rear seats, it will be understood that the invention is equally applicable to automobile bodies or the like of other types, such as two door bodies. In accordance, therefore, with the present embodiment of the invention the body 10 is provided at opposite sides with front and rear doors A and B, respectively, hinged in customary manner to the body pillars. In rear of the doors B the body is provided with rear quarter panelling C. As is customary in bodies of the four door type, herein illustrated, the front seat D is located opposite the front doors A and the rear seat E is located opposite the rear quarter panelling C.

Each front door A comprises a pressed metal outer door panel 11 and a pressed metal inner door panel 12, these panels being flanged and secured together in any conventional manner around their meeting edges as indicated at 13. In the upper part of each door there is provided the usual window opening 14 closed by means of a sliding glass panel 15 and a pivoted wing type panel 15a.

The inner door panel 12 has an upright portion 12a extending from the bottom jamb of the door a predetermined distance upwardly and extending in a generally vertical plane corresponding to the normal plane of the inner surface of the door, this lower part 12a of the inner door panel having, as is customary, several apertures such as indicated at 16, to permit access to the well 17 formed between the spaced outer and inner door panels 11 and 12.

Above the vertical portion 12a of the inner door panel 12 and a suitable distance below the window opening 14 the inner door panel is pressed or otherwise constructed to form a recess 18, this recess as shown in Fig. 2 being preferably generally triangular in shape so as to progressively increase in depth from the top to the bottom thereof. In the preferred embodiment the recess 18 is drawn or formed in the inner door panel 12 with the walls defining the recess being formed integrally from the panel. However, it will be understood that some or all of the walls of the recess may be formed partly from the inner door panel and partly or entirely from a separate stamping or stampings and welded to the inner door panel to form the recess 18 therein. As illustrated in Figs. 2 and 3, the recess 18 is formed by means of a back wall 19 which slopes downwardly and outwardly with respect to the main normal plane of the vertical portion 12a of the inner door panel, the lower edge of this wall terminating in a wall 21 which is inclined inwardly and downwardly to join the upper edge of the main inner wall 12a of the door panel. The back wall 19 of the recess preferably extends substantially parallel to the plane of the window panel 15 for a purpose hereinafter described.

In the present embodiment the upper edge of the back wall 19 of the recess 18 terminates in the main plane of the inner side of the door and from this point the inner door panel is preferably provided with a vertical portion 22 extending mainly in the plane of the portion 12a and terminating substantially at the lower edge of the window opening 14. The inclined wall 21 forms the bottom of the recess 18 and preferably extends substantially at right angles to the back wall 19. Hence, the bottom of the recess slopes inwardly and downwardly so as to dispose the inner edge thereof at a lower level than the lower edge of the back wall 19.

The upper portion 22 of the inner door panel, which extends the full width of the door above the recess 18, is in the present instance concealed by means of ornamental garnish moldings 23 and 24 secured in position in any suitable manner. The lower wall portion 12a of the inner door panel is concealed by means of an ornamental trim panel 25 secured thereto in conventional manner by means of snap fasteners in order to permit removal for gaining access to the well between the inner and outer door panels 11 and 12. It will be noted that the recess 18 in the door is formed within the area of the inner door panel and terminates at opposite ends short of the upright edges of the door. Thus, the inner metal door panel 12 is formed with vertical portions 12b and 12c at opposite ends of the recess 18 which lie substantially in the plane of the wall portion 12a below the recess. These portions 12b and 12c of the inner door panel 12 are also covered by means of the trim panel 25 which extends at opposite sides of the recess to the upper horizontal finish molding 23. The back wall 19 of the recess 18 as well as the upright end walls 19a and 19b thereof are also covered by trim paneling 26. In the present instance the bottom 21 of the recess is covered by means of a finish strip 27 which may be of metal having a bright finish or other ornamental material.

In forming the recess 18 in the front door it is preferred that the recess not only increase in depth from the top to the bottom thereof but also, as shown in Fig. 3, increase in depth from the front to the rear thereof. Thus, the front side wall 19b of the recess is of less depth than the rear side wall 19a thereof. This has the advantage of affording the necessary clearance within the front of the window well for operating mechanism or the like mounted therein while at the same time enabling the recess to be of maximum depth toward the rear thereof where the arm of the passenger rests when seated on the front seat D. The bottom 21 of the recess provides a shelf which may be apertured to receive an ash tray 28, the latter being located near the front of the shelf and entirely housed within the recess. It will be apparent that the slope of the bottom wall of the recess renders the ash tray 28 more convenient of access. As seen in Fig. 1, the offsetting of the wall portion 19 outwardly permits an arm rests 29 and the inside door hardware to be mounted upon the back wall 19 of the panel and housed within the recess 18 so as not to project inwardly beyond the main upright plane of the inner side of the door. Thus, the window regulator handle 30 as well as the operating handle 31 for the door lock lie within the recess 18 and furnish no protuberances inwardly of the normal plane of the door which in conventional automobile bodies is objectionable.

Each of the rear doors B is also provided with a recess 32 within the area thereof which may be formed in general similarly to the recess 18 and terminating in an inclined ledge or shelf 32a extending preferably substantially at right angles to the back wall of the recess. In the illustrated embodiment the depth of the recess 32 in each door B is somewhat greater than the greatest depth of recess 18 and is substantially uniform from the front to the rear thereof although increasing in depth from the top to the bottom as in the case of the recess 18. The rear quarter of the body at each end of the rear seat E is likewise formed with a recess 33 generally similar to the recess 18. The recess 33 increases in depth from the top to the bottom thereof and terminates in a sloping bottom wall or shelf 33a, similar to the shelf 21, upon which is mounted an ash tray 34. The recess 33 in the rear quarter enables the crank handle 35 for operating the rear window to be set inwardly of the main vertical plane of the inner wall of the rear quarter and also enables an arm rest 36 to be disposed within the recess in a more convenient location for the rear seat passenger. In the illustrated embodiment the recess 33 increases in depth from the rear edge to the front edge thereof.

In the preferred embodiment of the invention the recess 18 in each front door has a width in a direction longitudinally of the body greater than the width of the seat D so that the elbows of a person seated thereon and leaning against the back of the seat will in any longitudinally adjusted position of the seat and back be opposite a portion of the recess. In like manner each recess 33 preferably has a width at least as great as the width of the seat E and extends substantially to the back of the seat so as to provide space to receive the arms or elbows of the passenger seated on the seat E.

As previously stated, the wall 19 of the recess preferably extends substantially parallel to the plane of the glass window panel 15. This construction has the important advantage of enabling a standard type window regulator mechanism to be used without modification for raising and lowering the panel 15 which would otherwise not be practicable or possible due to the angular travel of the panel 15 with respect to the normal plane of the inner door panel 12a. By virtue of the present construction, where the regulator is mounted on the wall 19, the handle 30 turns in a plane substantially parallel to the plane of the window panel and the shaft 30a of the window regulator, driven by the handle 30, extends substantially at right angles to the plane of the window panel. The shaft 30a is connected through the usual clutch device to the gear 40 which in turn operates the swinging crossed arms 41 of the regulator, these arms swinging in planes parallel to the window panel and being connected to the latter in conventional manner through studs 42 slidable in guide slots in the channel 43 secured to the lower edge of the glass panel. Thus, the angularity of the recessed wall 19 not only enables the regulator handle 30 to be housed in the recess but also enables the handle shaft 30a to extend at right angles to the plane of the glass panel.

We claim:

1. In a vehicle body, a door structure comprising an inner upright wall structure having an outwardly extending offset portion providing a recess within the area of the wall structure, a window panel slidable up and down within said door structure, the back upright wall of said recess extending substantially parallel to the plane of said window panel, and a window regulator for raising and lowering said panel and including a handle mounted on said wall and a shaft operated thereby extending substantially at right angles to said plane.

2. In a vehicle body, inner and outer upright wall panels secured together in spaced relation to form a well, a window panel movable within said well to and from open and closed positions, said inner panel having an outwardly extending offset portion providing a recess within the area of the panel having a back upright wall extending substantially parallel to said window panel and terminating at its lower edge in a ledge, and a window regulator for moving said window panel including a rotatable handle mounted on said wall within said recess and shaft means rotatable thereby and extending substantially at right angles to said wall.

3. In a vehicle body, an inner upright wall structure having an outwardly extending offset portion providing a recess within the area of the wall structure, a window panel movable between open and closed positions within the body outwardly of the back upright wall of the recess, said back upright wall sloping downwardly and outwardly, and a window regulator for moving the window panel and including a handle mounted on said wall within the recess and shaft means operable thereby extending substantially at right angles to the plane of the window panel.

4. In a vehicle body, an inner upright wall structure having an outwardly extending offset portion providing a recess within the area of the wall structure, a window panel disposed outwardly of the back upright wall of the recess and movable between open and closed positions in an inclined plane, said back upright wall sloping downwardly and outwardly, and a window regulator for moving the window panel and including a handle mounted on said wall within the recess and shaft means operable thereby extending substantially at right angles to the plane of the window panel.

5. In a vehicle body structure, an inner upright wall structure having an outwardly extending offset portion providing a recess within the area of the wall structure, a window panel movable within said wall structure to and from open and closed positions in an inclined plane, and mechanism for opening and closing said window panel including shaft means extending through said wall within said recess substantially at right angles to said plane.

6. A vehicle body having a seat, a door mounted opposite said seat and comprising inner and outer upright wall panels secured together in spaced relation to form a well, the inner panel having an outwardly extending offset portion providing an arm receiving recess opposite the seat and an upright back portion of the recess sloping outwardly and downwardly and terminating at its lower edge in a shelf approximately at the level of said seat, an arm rest mounted on said offset back portion above said shelf and substantially housed within said recess, the forward end of the arm rest terminating substantially rearward of the forward end of said shelf, and an operable handle member mounted on said offset back portion forward of said arm rest.

7. A vehicle body having inner and outer upright wall panels secured together in spaced relation to form a well, a seat mounted transversely within the body, the inner panel having an outwardly extending offset portion providing an arm receiving recess opposite the seat and an upright back portion of the recess sloping outwardly and downwardly and terminating at its lower edge in a shelf extending longitudinally of the body approximately the longitudinal depth of the seat, and an arm rest mounted on said offset back portion above said shelf and substantially housed within said recess, the forward end of the arm rest terminating substantially rearward of the forward end of said shelf.

8. In a vehicle body, inner and outer upright wall panels secured together in spaced relation to form a well, a window panel movable within said well to and from open and closed position, said inner panel having an outwardly extending offset portion providing a recess within the area of the panel having a back upright wall extending substantially parallel to said window panel and terminating at its lower edge in a ledge, and window regulator mechanism mounted on said wall for moving said window panel and including rotatable shaft means extending substantially at right angles to said wall.

MILLARD H. TONCRAY.
FRANK S. SPRING.

REFERENCES CITED

The following references are of record in the file of this patent:

UNITED STATES PATENTS

| Number | Name | Date |
|---|---|---|
| 1,986,940 | Morrison | Jan. 8, 1935 |
| 2,005,198 | Morrison | June 18, 1935 |
| 2,068,505 | Morrison | Jan. 19, 1937 |
| 2,080,433 | Morrison | May 18, 1937 |
| 2,088,709 | Lejuste | Aug. 3, 1937 |
| 2,114,830 | Carr | Apr. 19, 1938 |

FOREIGN PATENTS

| Number | Country | Date |
|---|---|---|
| 422,460 | Great Britain | Jan. 11, 1935 |